USUS009419482B2

(12) United States Patent
Lee et al.

(10) Patent No.: US 9,419,482 B2
(45) Date of Patent: Aug. 16, 2016

(54) MOTOR AND ROTOR THEREOF

(71) Applicant: SAMSUNG ELECTRONICS CO., LTD., Suwon-si, Gyeonggi-do (KR)

(72) Inventors: Jae Young Lee, Daegu (KR); Young Gyu An, Cheongju-si (KR); Deok Jin Kim, Hwaseong-si (KR); Young Kwan Kim, Anyang-Si (KR); Byung Ryel In, Yongin-si (KR); Jin Woo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 695 days.

(21) Appl. No.: 13/741,508

(22) Filed: Jan. 15, 2013

(65) Prior Publication Data
US 2013/0187506 A1 Jul. 25, 2013

(30) Foreign Application Priority Data

Jan. 19, 2012 (KR) .................. 10-2012-0006425

(51) Int. Cl.
*H02K 1/27* (2006.01)
*H02K 1/28* (2006.01)

(52) U.S. Cl.
CPC .............. *H02K 1/28* (2013.01); *H02K 1/278* (2013.01); *H02K 1/2773* (2013.01)

(58) Field of Classification Search
CPC ....... H02K 1/28; H02K 1/128; H02K 1/2773; H02K 15/03
USPC ........................................ 310/156.12, 156.22
See application file for complete search history.

(56) References Cited

U.S. PATENT DOCUMENTS

| 5,091,668 A * | 2/1992 | Cuenot | H02K 1/2773 |
| | | | 310/156.61 |
| 6,429,566 B1 * | 8/2002 | Kuwahara | H02K 1/2773 |
| | | | 310/156.56 |
| 2009/0033167 A1 | 2/2009 | Bradfield | |
| 2009/0096308 A1 * | 4/2009 | Staudenmann | H02K 1/2773 |
| | | | 310/156.08 |
| 2010/0277017 A1 * | 11/2010 | Alexander | H02K 1/2773 |
| | | | 310/61 |
| 2011/0254399 A1 * | 10/2011 | Blanc | H02K 1/2773 |
| | | | 310/156.22 |
| 2013/0038161 A1 * | 2/2013 | Pan | H02K 1/2773 |
| | | | 310/156.01 |

FOREIGN PATENT DOCUMENTS

| JP | 02095149 A | * 4/1990 |
| JP | 2011-172441 | 9/2011 |

OTHER PUBLICATIONS

JP 02095149 A abtract translation.*
JP 02095149 A abstract translation Aug. 20, 2015.*
European Search Report dated May 6, 2016 issued in corresponding European Patent Application 13150895.4.

* cited by examiner

*Primary Examiner* — Joshua Benitez Rosario
*Assistant Examiner* — Leda Pham
(74) *Attorney, Agent, or Firm* — Staas & Halsey LLP

(57) ABSTRACT

A rotor having an improved structure capable of achieving enhanced durability is disposed in a motor, the rotor including a sleeve having a shaft hole, through which a motor shaft extends, rotor cores spaced apart from one another in a circumferential direction of the rotor, and permanent magnets each disposed between adjacent ones of the rotor cores such that the permanent magnets are arranged in a radial manner about the sleeve. First and second cover plates may be disposed at opposite sides of the permanent magnets in an axial direction. Each of the first and second cover plates may include a shaft receiving hole to receive the motor shaft. The rotor may include a plurality of support members each having a magnet support portion arranged to support an outer end of a corresponding one of the permanent magnets in a radial direction of the rotor.

17 Claims, 12 Drawing Sheets

MOTOR AND ROTOR THEREOF

CROSS-REFERENCE TO RELATED APPLICATIONS

This application claims the priority benefit of Korean Patent Application No. 10-2012-0006425, filed on Jan. 19, 2012, in the Korean Intellectual Property Office, the disclosure of which is incorporated herein by reference.

BACKGROUND

1. Field

Embodiments disclosed herein relate to a motor having an improved structure capable of achieving an enhanced durability.

2. Description of the Related Art

A motor is a machine which may obtain rotating force through electrical energy. In general, a motor includes a stator and a rotor. The rotor is configured to co-operate with the stator in an electromagnetic manner. The rotor is rotated by a force exerted between a magnetic field and current flowing through a coil.

Permanent magnet motors, which use permanent magnets to generate an electric field, may be classified into a surface mounted permanent magnet motor, an interior type permanent magnet motor, and a spoke type permanent magnet motor.

The spoke type permanent magnet motor may generate high power with high torque in that it exhibits high magnetic flux concentration. The spoke type permanent magnet motor may also be advantageous in that it may be miniaturized, as compared to other types of motors, for the same output power. The spoke type permanent magnet motor may be applied to drive motors for washing machines or electric vehicles, which require high power with high torque.

Generally, the rotor of the spoke type permanent magnet motor includes permanent magnets arranged about a rotating shaft in a radial manner, and a body to support the permanent magnets while defining passages for magnetic flux. The body may include cores each arranged between adjacent ones of the permanent magnets, and cylindrical supports each arranged between the rotating shaft and a corresponding one of the permanent magnets while being connected to a corresponding one of the cores.

In such a spoke type permanent magnet motor, the cores of the rotor may be deformed or damaged due to centrifugal force generated during high-speed rotation of the rotor because the body of the rotor is weak in terms of structure.

Furthermore, in the spoke type permanent magnet motor, magnetic flux may partially leak toward the rotating shaft through the cylindrical supports of the rotor body. When leakage of magnetic flux increases, the use rate of the permanent magnets may be increased, as compared to other types of motors, for the same motor power. In this case, accordingly, there may be disadvantages in terms of material costs and motor miniaturization

SUMMARY

Therefore, it is an aspect of the present invention to provide a rotor having an improved structure capable of achieving an enhanced durability, and a motor including the same.

It is another aspect of the present invention to provide a rotor having an improved structure capable of achieving a reduction in magnetic flux leakage, and a motor including the same.

Additional aspects of the invention will be set forth in part in the description which follows and, in part, will be obvious from the description, or may be learned by practice of the invention.

In accordance with an aspect of the present invention, a motor includes a stator and a rotor to co-operate with the stator in an electromagnetic manner such that the rotor rotates, and a motor shaft coupled to the rotor, to rotate along with the rotor. The stator may include stator cores and coils wound around the stator cores, and the rotor may include a sleeve having a shaft hole, through which the motor shaft extends, a plurality of rotor cores arranged to be spaced apart from one another in a circumferential direction of the rotor, a plurality of permanent magnets each disposed between adjacent ones of the rotor cores such that the permanent magnets are arranged in a radial manner about the sleeve, first and second cover plates disposed at opposite sides of the permanent magnets in an axial direction, each of the first and second cover plates including a shaft receiving hole to receive the motor shaft, and a plurality of support members coupled to at least one of the first and second cover plates, each of the support members including a magnet support portion arranged to support an outer end of a corresponding one of the permanent magnets in a radial direction of the rotor.

The first cover plate may further include coupling holes arranged in the circumferential direction of the rotor. Each of the support members may further include a coupling protrusion which protrudes from the magnet support portion in the axial direction to fit in a corresponding one of the coupling holes.

The coupling protrusion may have at least a portion extending outwardly of the first cover plate after passing through the corresponding coupling hole.

The coupling protrusion may have a head supported by an outer surface of the first cover plate around the corresponding coupling hole.

Each of the support members may further include a connection support portion connected to the coupling protrusion after inwardly extending from the magnet support portion in the radial direction of the rotor, to support an axial end of the corresponding permanent magnet.

The first cover plate may further include plate grooves each formed at an inner surface of the first cover plate facing the permanent magnets, to receive the connection support portion of a corresponding one of the support members.

Each of the support members may further include a first coupler provided at one end of the support member, to be coupled to the first cover plate; and a second coupler provided at the other end of the support member, to be coupled to the second cover plate.

The outer end of each of the permanent magnets may be disposed more inwardly in a radial direction of the rotor than outer surfaces of the corresponding rotor cores disposed adjacent to each other in the circumferential direction of the rotor at opposite sides of the permanent magnet. The rotor may further include a support member receiving portion defined by the adjacent rotor cores and the outer end of the permanent magnet disposed between the adjacent rotor cores. The magnet support portion of the support member corresponding to the permanent magnet may be received or disposed in the magnet member receiving portion.

The rotor cores may include first and second rotor cores arranged adjacent to each other in the circumferential direction of the rotor. The adjacent first and second rotor cores may include outer support protrusions extending to support the outer end of the permanent magnet disposed between the adjacent first and second rotor cores, respectively. The magnet support portion of the support member corresponding to the permanent magnet may be disposed between the outer support protrusion of the first rotor core and the outer support protrusion of the second rotor core. The first and second cover plates may be forcibly fitted around the motor shaft, to be fixed.

Each of the support members may further include a non-magnetic body.

Each of the rotor cores may include a side surface facing the corresponding permanent magnet in the circumferential direction of the rotor. The side surface of at least one of the rotor cores may include at least one side protrusion extending toward a side surface of the corresponding permanent magnet.

Each of the rotor cores may further include an aperture formed adjacent to the side protrusion of the rotor core, to assist deformation of the side protrusion.

The at least one side protrusion may include a plurality of side protrusions arranged in a radial direction of the rotor.

The rotor cores may include first and second rotor cores arranged adjacent to each other in the circumferential direction of the rotor. The first rotor core may include a first side protrusion extending to press a first side surface of the permanent magnet disposed between the adjacent first and second rotor cores. The second rotor core may include a second side protrusion extending to press a second side surface of the permanent magnet disposed between the adjacent first and second rotor cores. The first and second side protrusions may be arranged to correspond to each other in the circumferential direction of the rotor.

The rotor body may have a longer axial length than the permanent magnets. The side protrusion may extend axially outwardly of the permanent magnet, to support an axial end of the permanent magnet.

In accordance with another aspect of the present invention, a rotor of a motor may be disposed within a stator of the motor. The rotor may include a sleeve formed with a shaft hole to be coupled with a motor shaft, a plurality of rotor cores arranged to be spaced apart from one another in a circumferential direction of the rotor, to define a plurality of rotor slots, a plurality of bridges arranged to connect the rotor cores to the sleeve, respectively, a plurality of permanent magnets respectively inserted into the rotor slots such that each of the permanent magnets has an inner end spaced apart from the sleeve, a plurality of inner support protrusions extending from the sleeve toward the rotor slots, to support the inner ends of the permanent magnets, respectively, a plurality of side protrusions extending from the rotor cores toward the rotor slots, to press side surfaces of the permanent magnets, respectively, and a plurality of support units each having at least a portion disposed outside a corresponding one of the permanent magnets in a radial direction of the rotor, to support at least a portion of an outer end of the corresponding permanent magnet.

The rotor may further include first and second cover plates disposed at opposite sides of the permanent magnets in an axial direction, each of the first and second cover plates including a shaft receiving hole to receive the motor shaft. Each of the support units may include a magnet support portion disposed to support an outer portion of the corresponding permanent magnet in the radial direction of the rotor, a first coupler coupled to the first cover plate, and a second coupler coupled to the second cover plate.

Each of the support units may include an outer support protrusion extending from a corresponding one of the rotor cores toward a corresponding one of the rotor slots, to support an outer end of the corresponding permanent magnet.

The rotor cores may include first and second rotor cores arranged adjacent to each other in the circumferential direction of the rotor. The plurality of side protrusions may include a first side protrusion extending to press a first side surface of the permanent magnet disposed between the adjacent first and second rotor cores, and a second side protrusion extending to press a second side surface of the permanent magnet.

Each of the rotor cores may further include an aperture formed adjacent to the side protrusion of the rotor core, to assist deformation of the side protrusion.

In accordance with another aspect of the present invention, a motor may include a stator and a rotor, the rotor including a sleeve having an annular structure which is formed with a shaft hole in which a motor shaft is fitted, a plurality of rotor cores and magnets alternately arranged circumferentially about the sleeve, a plurality of bridges arranged circumferentially about the sleeve to connect the plurality of rotor cores to the sleeve, a plurality of inner support protrusions extending outwardly in a radial direction from the sleeve to form a space between each of the plurality of magnets and the sleeve, and a plurality of support units arranged in a circumferential direction of the rotor to support the plurality of magnets in an axial direction and a radial direction of the rotor.

Each bridge among the plurality of bridges may correspond to a respective rotor core and each inner support protrusion among the plurality of inner support protrusions may correspond to a respective magnet. For example, each bridge among the plurality of bridges may be centrally disposed between adjacent inner support protrusions among the plurality of inner support protrusions, and each inner support protrusion among the plurality of inner support protrusions may be disposed at a central portion of the corresponding magnet.

Each of the plurality of inner support protrusions may include a connecting portion connected to the sleeve and a contact portion formed with a round surface to contact the corresponding magnet, wherein a width of the contact portion may be less than a width of the connecting portion.

Each support unit among the plurality of support units may support a corresponding magnet in the axial direction using a coupling member disposed on at least one end of the support unit which couples the support unit together with at least one cover plate among a first cover plate and a second cover plate disposed at first and second ends of the rotor in the axial direction. Further, each support unit among the plurality of support units may support a corresponding magnet in the radial direction using a magnet support portion disposed to support an outer end of the corresponding magnet in the radial direction.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
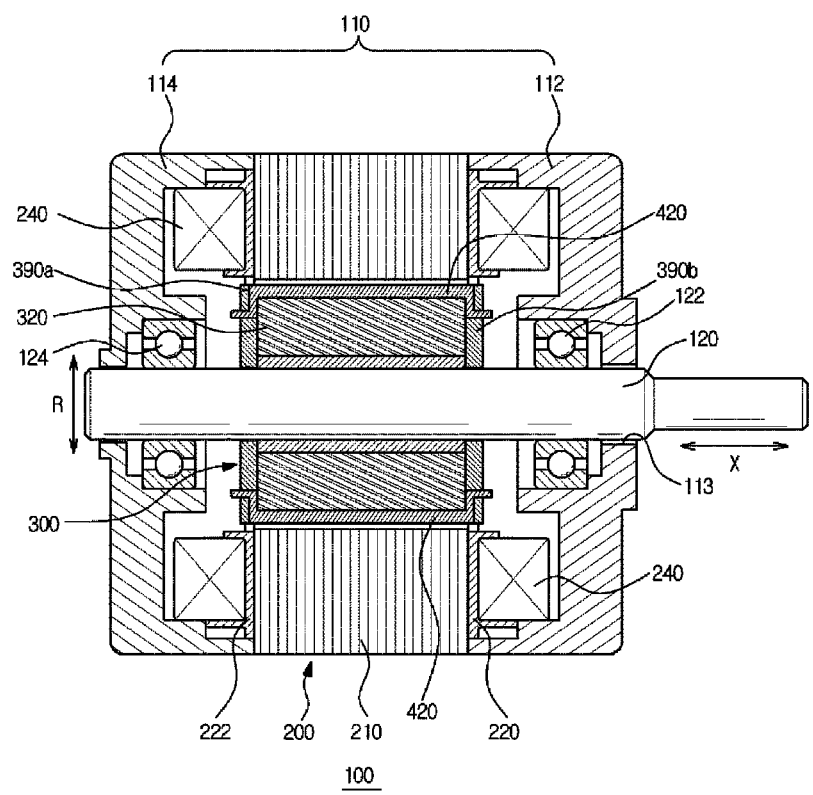
FIG. 1 is a sectional view illustrating a configuration of a motor according to an exemplary embodiment of the present invention.

Hereinafter, embodiments of the present invention will be described with reference to the accompanying drawings. In the following description, "axial direction X" refers to a direction parallel to a motor shaft, for example, as shown in FIG. 1. "Circumferential direction C" refers to a direction extending along the circumference of a circle, and "radial direction R" refers to a direction extending along the radius of the circle.

Referring to FIG. 1, a motor 100 is illustrated. The motor 100 includes a motor housing 110 to form an outer appearance of the motor 100. The motor housing 110 may include a first housing 112 and a second housing 114, which are separated from each other in an axial direction of the motor 100. The first housing 112 and second housing 114 may be fastened to a stator 200.

The stator 200 is disposed within the motor housing 110, along with a rotor 300. The stator 200 may be fixed to the motor housing 110. The rotor 300 is configured to co-operate with the stator 200 in an electromagnetic manner such that the rotor 300 rotates. The rotor 300 may be disposed within the stator 200.

A motor shaft 120 is inserted into the rotor 300 such that it rotates along with the rotor 300. The motor shaft 120 is rotatably supported, at one side thereof, by the first housing 112 via a bearing 122. The motor shaft 120 is rotatably supported, at the other side thereof, by the second housing 114 via a bearing 124. One end of the motor shaft 120 protrudes outwardly of the motor housing 110 through an opening 113 formed at the first housing 112.

Figure 2:
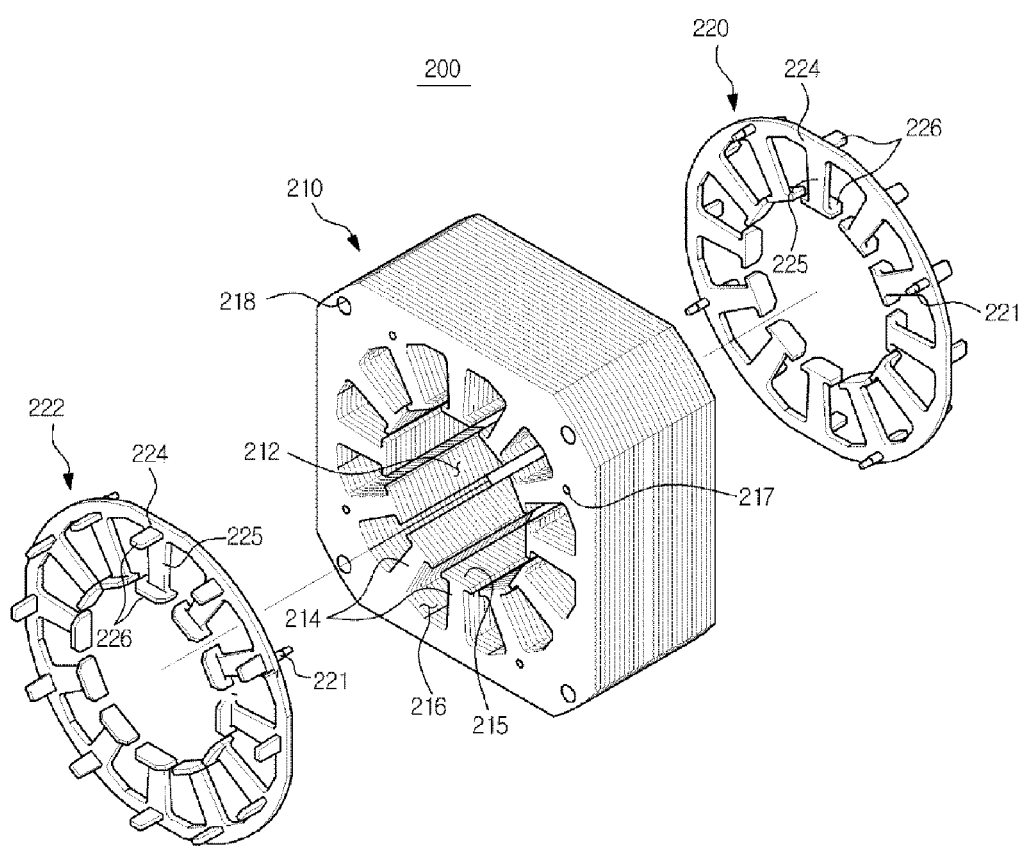
FIG. 2 is a perspective view illustrating a stator included in the illustrated embodiment of the present invention.
Figure 3:
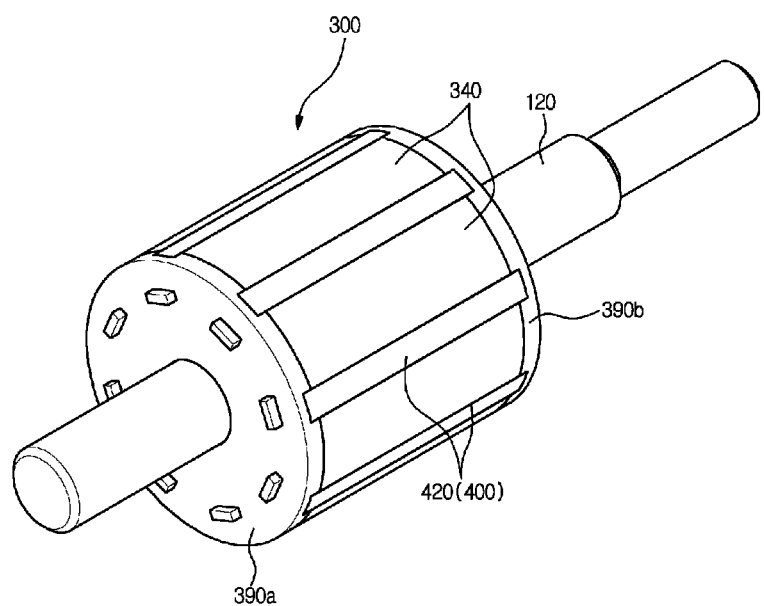
FIG. 3 is a perspective view illustrating a rotor according to the illustrated embodiment of the present invention.

As shown in FIGS. 1 and 2, the stator 200 may include a stator body 210, a first insulator 220, a second insulator 222, and coils 240. The coils 240 are not shown in FIG. 2.

A space is formed at a central portion of the stator body 210, to receive the rotor 300. Stator cores 214 are arranged around a rotor receiving portion 212 in a circumferential direction (e.g., direction C in FIG. 5) of the rotor 300. The stator cores 214 extend in a radial direction from the rotor receiving portion 212. The stator body 210 may be formed by stacking pressed iron plates.

As the stator cores 214 are spaced apart from one another in the circumferential direction, stator slots 216 are formed such that each stator slot 216 is arranged between the adjacent stator cores 214. The coils 240 are wound around the stator cores 214, respectively, such that they are received in the stator slots 216. Each stator core 214 is formed with an extension core portion 215 at an inner end thereof adjacent to the rotor 300. The extension core portion 215 has an increased width. The stator core 214 formed together with the extension core portion 215 is substantially t-shaped. A clearance is defined between an inner surface of each extension core portion 215 and an outer surface of the rotor 300, for rotation of the rotor 300.

The first insulator 220 and second insulator 222 are made of a material having an electrical insulation property. The first insulator 220 and second insulator 222 are arranged at opposite sides of the stator body 210 in the axial direction. The first insulator 220 and second insulator 222 are coupled to opposite sides of the stator body 210, respectively, to cover the stator core 214. Each of the first insulator 220 and second insulator 222 is formed with coupling protrusions 221 extending toward the stator body 210. The coupling protrusions 221 are fitted into coupling holes 217 formed at the stator body 210.

Each of the first insulator 220 and second insulator 222 includes an annular rim 224, coil supports 225 arranged to correspond to respective stator cores 214, and coil guides 226 respectively protruded from radial inner and outer ends of each coil support 225. The coil guides 226 in both the first insulator 220 and second insulation 222 protrude in a direction away from the stator body 210. The coil supports 225 are spaced apart from one another in the circumferential direction such that a space corresponding to each stator slot 216 is defined between the adjacent coil supports 225.

The coils 240 are wound around the stator core 214 and the coil supports 225 of the first and second insulators 220 and 222 in a state in which the first and second insulators 220 and 222 are coupled to the stator body 210.

Fastening holes 218 may be formed to axially extend through the stator body 210. Fastening members (not shown) such as pins or rivets may be fastened to the fastening holes 218 in order to couple plates constituting the stator body 210.

Through holes (not shown) are formed through the first and second housings 112 and 114, to correspond to the fastening holes 218 of the stator body 210. Thus, the first housing 112, second housing 114, and stator 200 may be fastened by the single fastening members.

As shown in FIGS. 3 to 6, the rotor 300 includes a rotor body 310 arranged in the rotor receiving portion 212 (FIG. 2) of the stator body 210, and permanent magnets 320 inserted into the rotor body 310. The rotor body 310 may be formed by stacking plate members, which are prepared by pressing a silicon steel plate.

In order to reinforce the structural rigidity of the rotor 300, a first cover plate 390a and a second cover plate 390b may be disposed at opposite sides of the rotor body 310 in the axial direction (direction X), respectively. A shaft hole 392 may be centrally formed through the first and second cover plates 390a and 390b, to receive the motor shaft 120.

Figure 4:
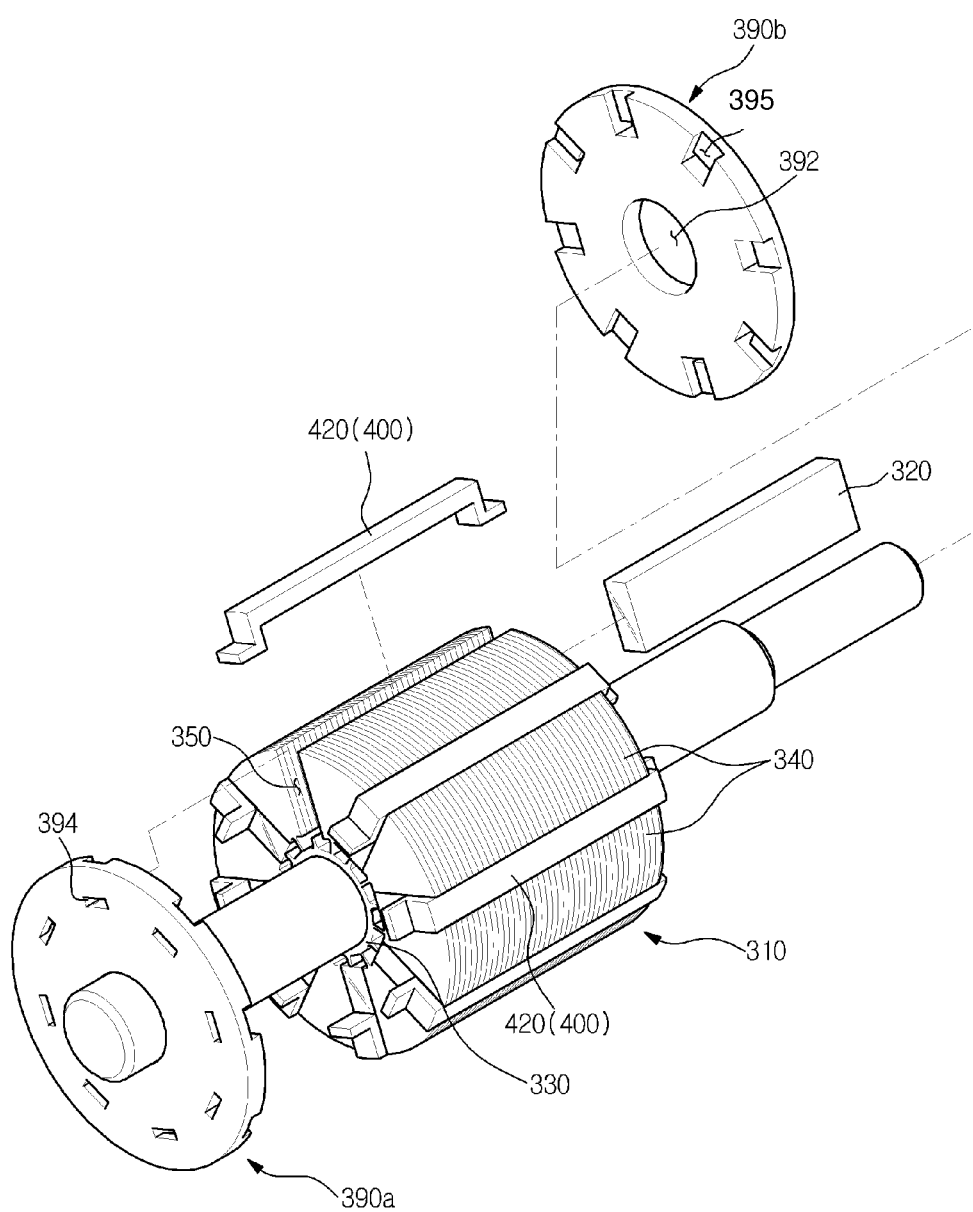
FIG. 4 is an exploded perspective view illustrating the rotor according to the illustrated embodiment of the present invention.

The first and second cover plates 390a and 390b are arranged to cover outsides of the permanent magnets 320 in the axial direction. For example, as shown in FIG. 4, a permanent magnet 320 inserted into a rotor slot 350 may be covered at a first end side surface by the first cover plate 390a and be covered at a second end side surface by the second cover plate 390b. An exposed top surface (outward radial direction) of the permanent magnet may be covered by a support member 420, which will be explained in more detail later. Thus, the first and second cover plates 390a and 390b prevent the permanent magnets 320 from being separated from the rotor 300 in the axial direction. The first and second cover plates 390a and 390b may also be used as a structure to balance the rotor 300 when the rotor 300 is in an unbalanced state. The first and second cover plates 390a and 390b may be made of a non-magnetic material, for example, copper or stainless steel.

Figure 5:
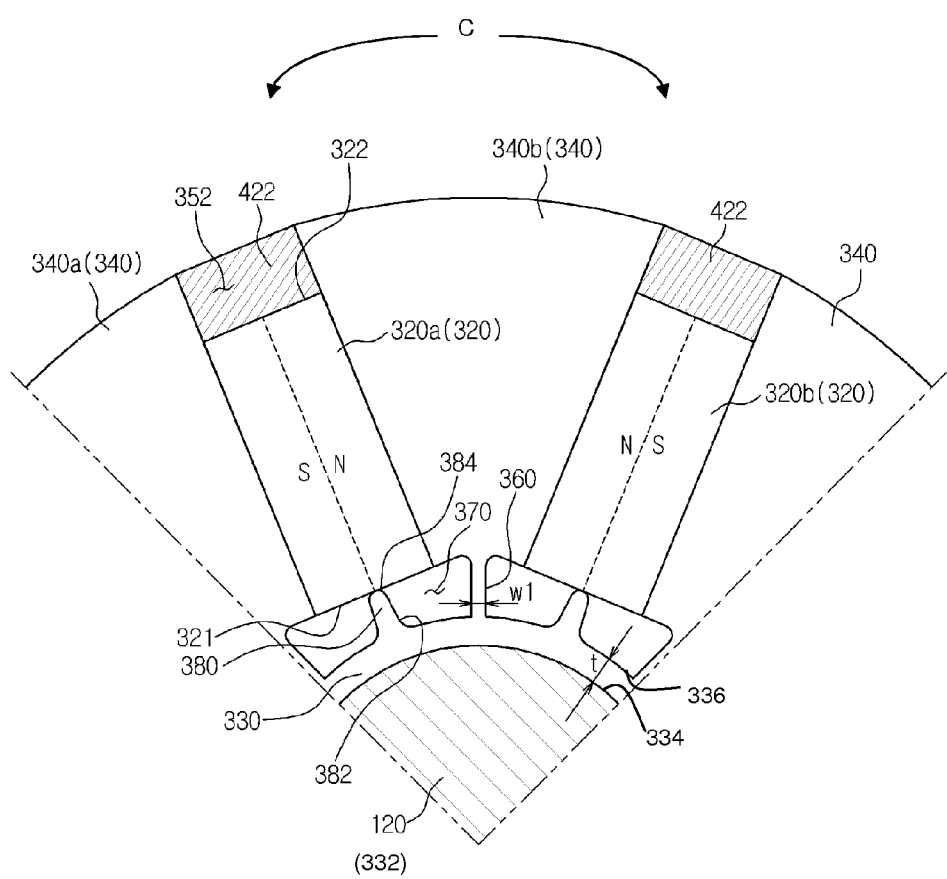
FIG. 5 is an enlarged cross-sectional view taken along the line I-I of FIG. 3.

As shown in FIGS. 4 and 5, the permanent magnets 320 are arranged in the circumferential direction of the rotor 300 such that they are disposed around the motor shaft 120 in a radial manner. FIG. 4 illustrates an example in which eight permanent magnets are arranged. However, the number of permanent magnets may be varied. The permanent magnets may be ferrite magnets or magnets containing a rare earth material such as neodymium or samarium.

Each permanent magnet 320 has an inner end 321 disposed adjacent to the motor shaft 120 in the radial direction of the rotor 300. Each permanent magnet 320 also has an outer end 322 disposed adjacent to the stator 200. The inner end 321 and outer end 322 of each permanent magnet 320 have shorter sides extending in the circumferential direction of the rotor 300, and longer sides extending in the radial direction of the rotor 300. In each permanent magnet 320, the shorter sides are connected to the longer sides. The longer sides have a longer length than the shorter sides. For example, each permanent magnet may be formed in the shape of a cuboid, in which a first length of the cuboid in the axial direction X is longer than a second length of the cuboid in the radial direction R, and the second length is longer than a third length of the cuboid in the circumferential direction C. Alternatively, two or more lengths of the cuboid may be equal to one another.

Each permanent magnet 320 has N and S poles (N and S referring to polarities of the permanent magnet 320) arranged in the circumferential direction of the rotor 300. Adjacent ones of the permanent magnets 320, namely, a first permanent magnet 320a and a second permanent magnet 320b, are arranged such that the same poles thereof face each other. In accordance with a magnetic circuit established by the above-described magnet arrangement, it may be possible to concentrate magnetic flux generated from the permanent magnets, and thus achieves an enhancement in performance while reducing motor size.

The rotor body 310 includes a sleeve 330 formed with a shaft hole 332, in which the motor shaft 120 is fitted, and rotor cores 340 connected to the sleeve 330.

The sleeve 330 has an annular structure. The sleeve 330 has an inner circumference 334 contacting the motor shaft 120 fitted in the shaft hole 332, and an outer circumference 336 facing the permanent magnets 320 inserted into the rotor body 310.

The thickness t of the sleeve 330 between the inner and outer circumferences 334 and 336 may range between about 1.0 mm and about 3.0 mm. When the thickness t is greater than 3.0 mm, leakage of magnetic flux from the rotor cores 340 to the sleeve 330 increases, thereby degrading the performance of the motor. On the other hand, when the thickness t is smaller than 1.0 mm, there may be a structural problem in that the sleeve 330 may be deformed when the motor shaft 120 is forcibly fitted into the shaft hole 332.

The rotor cores 340 support the permanent magnets 320 while establishing magnetic paths for magnetic flux generated from the permanent magnets 320. The rotor cores 340 are arranged in the circumferential direction of the rotor 300 while being spaced apart from one another, to form rotor slots 350 to receive the permanent magnets 320.

The rotor cores 340 may be connected to the sleeve 330 via bridges 360, respectively. The bridges 360 are arranged in the circumferential direction of the rotor 300 while corresponding to respective rotor cores 340. Each bridge 360 outwardly extends from the outer circumference 336 of the sleeve 330 in the radial direction, to be connected to the inner end of the corresponding rotor core 340.

Each bridge 360 may have a width W1 of about 1.0 mm or less. The width W1 of each bridge 360 may influence the amount of magnetic flux leaking toward the sleeve 330 through the bridge 360. When the width W1 of each bridge 360 is reduced, an increase in magnetic resistance may occur, thereby reducing leakage of magnetic flux in accordance with an increase in magnetic resistance.

However, when the width W1 of each bridge 360, which is a structure to connect the corresponding rotor core 340 to the sleeve 330, is excessively reduced, the bridge 360 may be damaged or the rotor body 310 may be deformed during high-speed rotation of the rotor 300. Therefore, the width W1 of each bridge 360 may be about 0.4 mm or more in order to secure a desired structural strength.

The permanent magnets 320 are received in respective rotor slots 350, each of which is defined between the adjacent two rotor cores 340. Since each permanent magnet 320 is arranged to be spaced apart from the sleeve 330, an inner space 370 (FIG. 5) is formed between the permanent magnet 320 and the sleeve 330. By virtue of the inner space 370, it may be possible to effectively suppress leakage of magnetic flux from the permanent magnet 320 toward the motor shaft 120 via the sleeve 330.

The rotor body 310 includes inner support protrusions 380 to support the inner ends 321 of the permanent magnets 320, respectively, in order to space the permanent magnets 320 from the sleeve 330. The inner support protrusions 380 are arranged to correspond to respective permanent magnets 320. The inner support protrusions 380 extend outwardly from the outer circumference 336 of the sleeve 330 in the radial direction toward the inner ends 321 of the permanent magnets 320. The sleeve 330, rotor cores 340, bridges 360, and inner support protrusions 380 may be integrally formed using the same material, to constitute the rotor body 310.

Each inner support protrusion 380 is arranged between the bridges 360 disposed adjacent to each other in the circumferential direction of the rotor 300. In this case, each inner support protrusion 380 may be spaced apart from the adjacent bridges 360. The inner support protrusions 380 may be formed to be separate from the bridges 360.

When the structure to support the permanent magnets is integrated with the bridges, the width of the bridges increases, thereby causing an increase in leakage of magnetic flux toward the motor shaft. However, when the inner support protrusions 380 are formed separately from the bridges 360, to be separate from the bridges 360, as shown in FIG. 5, it may be possible to reduce the width of the bridges 360, to thereby reduce leakage of magnetic flux.

When each inner support protrusion 380 is disposed near the corresponding bridges 360, leakage of magnetic flux toward the sleeve 330 via the inner support protrusion 380 is increased, even though the inner support protrusion 380 is separate from the bridges 360. To this end, each inner support protrusion 380 may be centrally disposed in the corresponding inner space 370 in the circumferential direction of the rotor 300 such that the inner support protrusion 380 is spaced apart from the two bridges 360 disposed adjacent thereto as far as possible. Also, each bridge 360 may be centrally disposed between the adjacent two inner support protrusions 380.

Each inner support protrusion 380 may be arranged to support a central portion of the inner end 321 of the corresponding permanent magnet 320. Then, it may be possible to stably support the permanent magnet 320 in the case in which the inner end of the permanent magnet 320 is supported by one support protrusion. The central portion of the inner end 321 of the permanent magnet 320 corresponds to a region where the N and S poles of the permanent magnet 320 meet. When the inner support protrusion 380 supports the above-described region, it may be possible to reduce leakage of magnetic flux through the inner support protrusion 380.

Each inner support protrusion 380 includes a connecting portion 382 connected to the sleeve 330, and a contact portion 384 contacting the corresponding permanent magnet 320.

In each inner support protrusion 380, the width of the connecting portion 382 may be greater than the width of the contact portion 384. The connecting portion 382 of each inner support protrusion 380 should have a width greater than a minimum width capable of providing a desired structural strength to the inner support protrusion 380. Although the contact portion 384 of each inner support protrusion 380 may have a further increased width in terms of stable support for the corresponding permanent magnet 320, adverse affects may be exhibited due to the increased width during magnetization of the permanent magnet 320.

Each permanent magnet 320 is magnetized after being inserted into the corresponding rotor slot 350 in a non-magnetized state. In this case, when the width of the contact portion contacting the corresponding permanent magnet 320 is excessively great, the magnetic field to magnetize the permanent magnet 320 may leak through the inner support protrusion 380. As a result, unstable magnetization of the permanent magnet 320 may be exhibited in the vicinity of the contact portion 384.

To this end, the width of the contact portion 384 of each inner support protrusion 380 may be minimized to the extent that the permanent magnet 320 is stably maintained. The contact portion 384 of each inner support protrusion 380 may be formed with a round surface in order to reduce the contact area of the contact portion 384 contacting the corresponding permanent magnet 320. Alternatively, the contact portion 384 may be formed in another shape, for example, a rectangular shape.

As shown in FIGS. 3 to 6, the rotor 300 includes support units 400 to support the outer ends of the permanent magnets 320, respectively. At least a portion of each support unit 400 is disposed outside the corresponding permanent magnet 320 in the radial direction of the rotor 300. Each support unit 400 supports the outer end 322 of the corresponding permanent magnet 320, to prevent the permanent magnet 320 from being separated from the rotor body 310 due to centrifugal force during rotation of the rotor 300.

Figure 6:
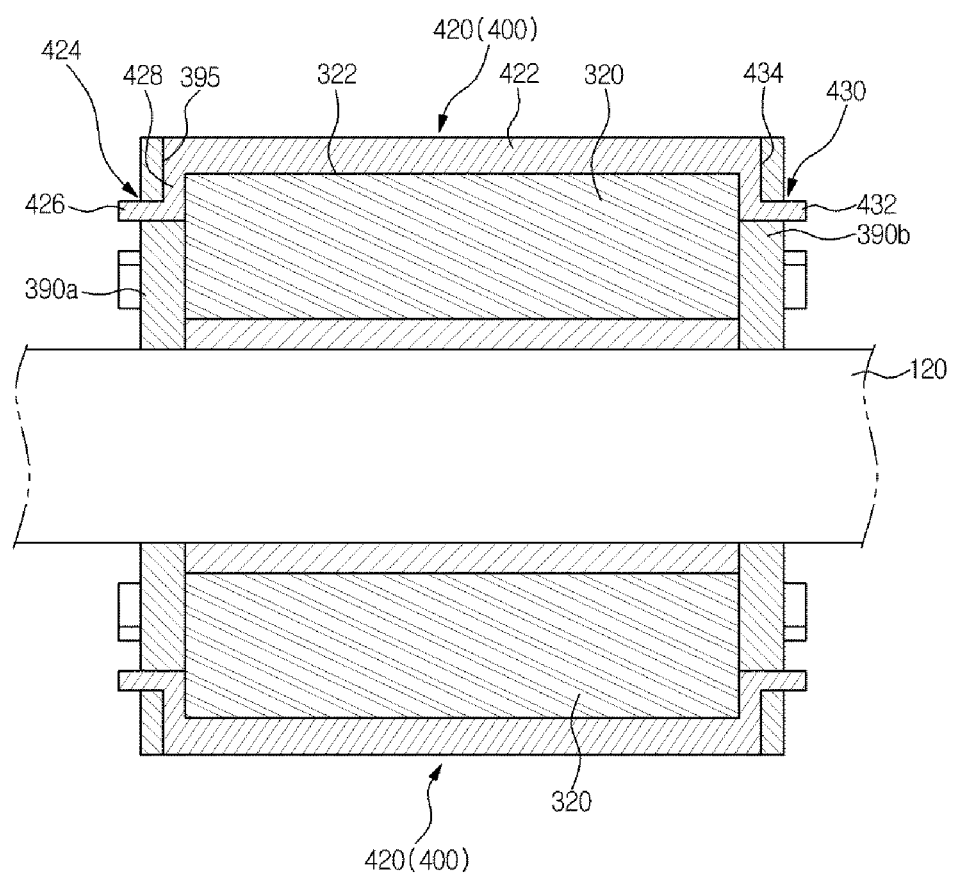
FIG. 6 is a cross-sectional view taken along the line II-II of FIG. 3.

Each support unit 400 may include a support member 420 coupled to at least one of the first and second cover plates 390a and 390b. The support member 420 may be made of a non-magnetic material, for example, stainless steel or a plastic material. FIG. 6 illustrates an example in which the support member 420 is coupled to both the first and second cover plates 390a and 390b. However, the support member 420 may be supported by only one of the first and second cover plates 390a and 390b.

The support member 420 has a magnet support portion 422 disposed to support the outer end 322 of the permanent magnet 320 in the radial direction of the rotor 300.

The outer end 322 of each permanent magnet 320 may be disposed more inwardly in the radial direction of the rotor 300 than the outer peripheral surfaces of the corresponding rotor cores 340. For example, as shown in FIG. 5, the permanent magnets 322 do not extend as far outwardly in the radial direction compared to the rotor cores 340. A support member receiving space 352 is defined by the two rotor cores adjacent to each other in the circumferential direction of the rotor 300, for example, first and second rotor cores 340a and 340b, and the outer end 322 of the permanent magnet 320 disposed between the first and second rotor cores 340a and 340b. The magnet support portion 422 may be disposed within the support member receiving space 352, such that an inner surface (in the radial direction) of the magnet support portion 422 is adjacent to the permanent magnet 320, and an outer surface (in the radial direction) of the magnet support portion 422 extends so that the outer surface lies substantially flush along the circumferential direction of the rotor 300 with the outer surfaces of the adjacent rotor cores. The inner surface of the magnet support portion 422 may form an outer surface of the rotor body 310, along with the outer peripheral surfaces of the rotor cores 340.

The support member 420 may include a first coupler 424 provided at one end of the support member 420, to be coupled to the first cover plate 390a.

The first coupler 424 may be constituted by a coupling protrusion 426 protruded from the magnet support portion 422 toward the first cover plate 390a. The first cover plate 390a may be provided with coupling holes 394 arranged in the circumferential direction of the rotor 300, to correspond to respective support members 420. The coupling protrusion 426 of each support member 420 is fitted in the corresponding coupling hole 394, so that the support member 420 is supported by the first cover plate 390a.

In order to stably couple the support member 420 to the first cover plate 390a, at least a portion of the coupling protrusion 426 may be protruded outwardly of the first cover plate 390a after passing through the coupling hole 394.

Figure 7:
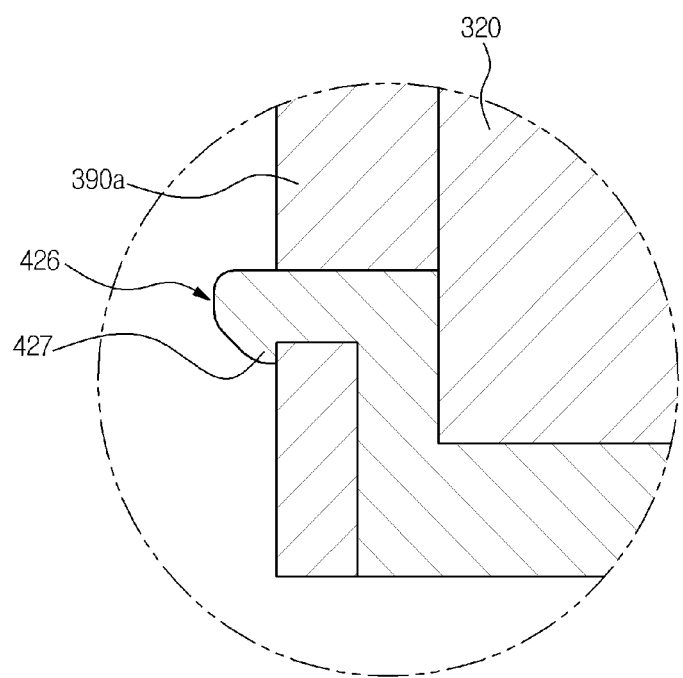
FIG. 7 is a view illustrating an example in which a coupling protrusion in the rotor of FIG. 3 has a head.

As shown in FIG. 7, the coupling protrusion 426 may include a head 427 supported by an outer surface of the first cover plate 390a around the coupling hole 394. The head 427 prevents the first cover plate 390a from being separated from the support member 420. The support member 420 is firmly fixed to the first cover plate 390a and second cover plate 390b by heads 427 provided at opposite ends of the support member 420. Thus, the support member 420 may also function as a member to fix the two cover plates 390a and 390b.

The head 427 may have a hook shape such that it is forcibly fitted in the corresponding coupling hole 394 of the first cover plate 390a when the rotor 300 is assembled. While the hook faces downward in FIG. 7, other configurations are possible, including having the hook facing the opposite direction or having two hooks, one facing each direction.

The support member 420 may also include a first connection support portion 428 connected to the coupling protrusion 426 after inwardly extending from the magnet support portion 422 in the radial direction of the rotor 300. The first connection support portion 428 is arranged between the first cover plate 390a and the corresponding permanent magnet 320, to support axial ends of the permanent magnet 320. Accordingly, the permanent magnet 320 is prevented from moving axially by the first connection support portion 428. Thus, an enhancement in the structural stability of the rotor 300 is achieved.

The first cover plate 390a is formed, at an inner surface thereof facing the permanent magnets 320, with plate grooves 395 to receive the first connection support portions 428 of the support members 420, respectively. Thus, the plate grooves 395 may be arranged circumferentially about the rotor 300, with each plate groove corresponding to a location of first connection support portions 428 of the support members. Further, plate grooves 395 may also correspond to locations of coupling holes 394 which are also disposed in the circumferential direction of the rotor 300.

Each support member 420 may also include a second coupler 430 provided at the other end of the support member 420, to be coupled to the second cover plate 390b. Similar to the configuration of the first coupler 424, the second coupler 430 may include a coupling protrusion 432 and a second connection support portion 434.

The first cover plate 390a and second cover plate 390b may be forcibly fitted around the motor shaft 120 such that they are fixed. In this case, the coupling between the support member 420 and the first and second cover plate 390a and 390b may be firmly maintained without structures such as heads to fix the support member 420 and the first and second cover plate 390a and 390b.

Although not shown, the rotor 300 may be reinforced by a plastic member integrated with the outer surface of the rotor body 310 and the outer surfaces of the first and second cover plates 390a and 390b through insert injection molding. In this case, the coupling protrusions 426 and 432 respectively protruded outwardly of the first and second cover plates 390a and 390b may function to assist coupling between the plastic member and the first and second cover plates 390a and 390b. By way of illustration, in FIG. 3 it can be seen that coupling protrusions protrude outwardly from the first cover plate 390a.

Figure 8:
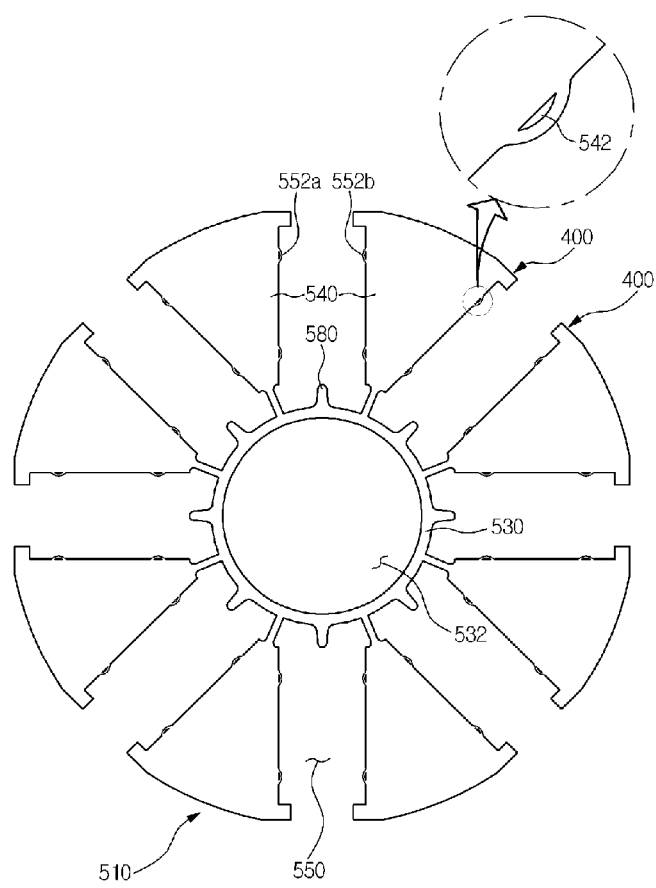
FIG. 8 is a view illustrating a rotor body included in a rotor according to another embodiment of the present invention.
Figure 9:
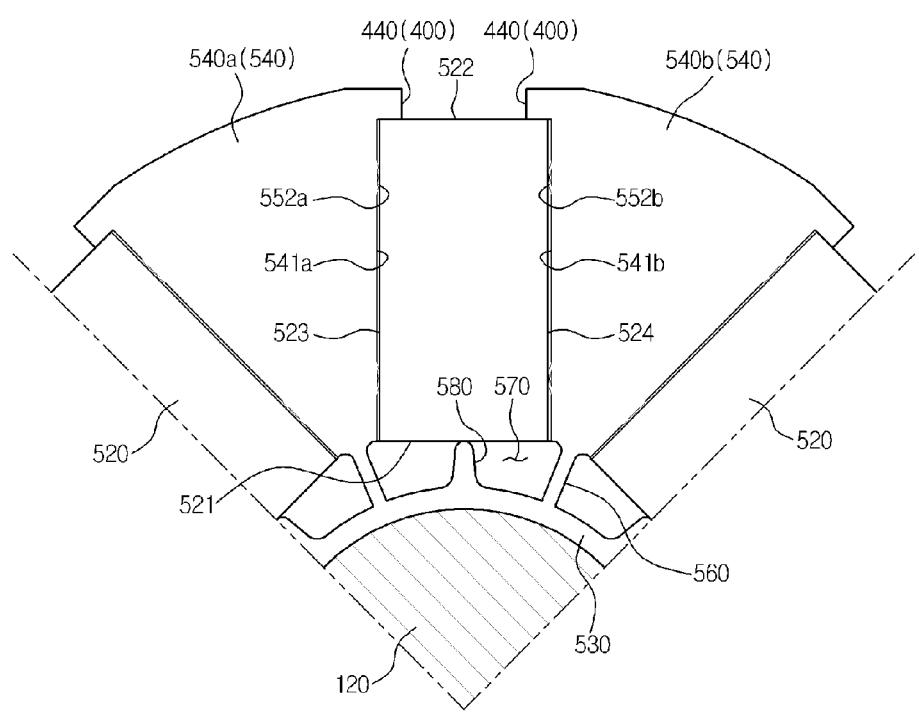
FIG. 9 is an enlarged view illustrating a portion of the rotor according to the embodiment of the present invention shown in FIG. 8.
Figure 10:
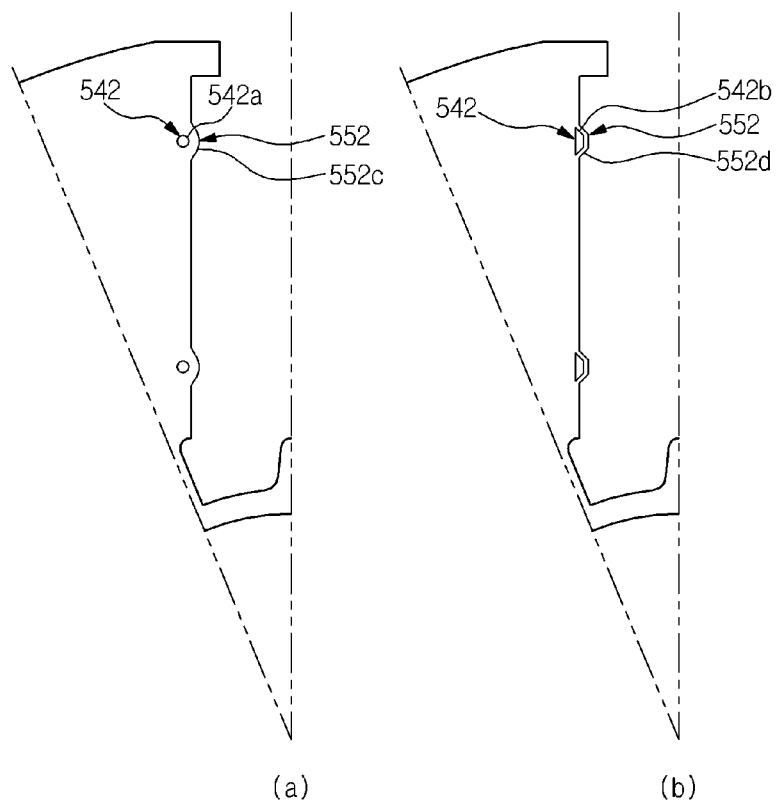
FIG. 10 is an enlarged view illustrating different examples of side protrusions in the rotor according to the embodiment of the present invention shown in FIG. 8.

FIGS. 8 to 10 illustrate a rotor according to an embodiment of the present invention. As shown in FIGS. 8 and 9, the rotor includes a rotor body 510, and permanent magnets 520 (FIG. 9) inserted into the rotor body 510.

The rotor body 510 includes a sleeve 530 and rotor cores 540. The sleeve 530 has an annular structure. The sleeve 530 has a shaft hole 532 to be coupled with the motor shaft 120. The rotor cores 540 are connected to the sleeve 530 via bridges 560, respectively. The rotor cores 540 are arranged to be spaced apart from one another in a circumferential direction of the rotor 500, to define rotor slots 550.

Each permanent magnet 520 is inserted into a corresponding one of the rotor slots 550. Each permanent magnet 520 is arranged between corresponding ones of the rotor cores 540 disposed adjacent to each other in the circumferential direction of the rotor, for example, the corresponding first and second rotor cores 540a and 540b.

Each permanent magnet 520 has an inner end 521 spaced apart from the sleeve 530. Thus, an inner space 570 is defined between the permanent magnet 520 and the sleeve 530. The inner ends 521 of the permanent magnets 520 are supported by inner support protrusions 580. Each inner support protrusion 580 is protruded from the sleeve 530 toward a corresponding one of the rotor slots 550 while being arranged between corresponding ones of the bridges 560 disposed adjacent to each other in the circumferential direction of the rotor 500.

The rotor includes support units 400 to support outer ends 522 of the permanent magnets 520, respectively. Each support unit 400 may be constituted by an outer support protrusion 440 disposed to support the outer end 522 of the corresponding permanent magnet 520. Each outer support protrusion 440 extends from the corresponding rotor core 540 towards the corresponding rotor slot 550, to cover a corresponding lateral edge of the outer end 522 of the permanent magnet 520. Thus, a portion of the outer end 522 of the permanent magnet 520 is covered on each side by outer support protrusions 440 which extend from adjacent rotor cores (e.g., first and second rotor cores 540a and 540b).

Each rotor core 540 may be provided with side protrusions 552 extending to the insides of the corresponding rotor slots 550, respectively. For example, the first rotor core 540a and second rotor core 540b, which are disposed at opposite sides of the corresponding permanent magnet 520, may include a first side protrusion 552a and a second side protrusion 552b, each extending toward the permanent magnet 520, respectively. The first rotor core 540a has a side surface 541a facing a first side surface 523 of the permanent magnet 520. The first side protrusion 552a is formed at the side surface 541a of the first rotor core 540a. The second rotor core 540b has a side surface 541b facing a second side surface 524 of the permanent magnet 520. The second side protrusion 552b is formed at the side surface 541b of the second rotor core 540b.

The first side protrusion 552a and second side protrusion 552b press the side surfaces 523 and 524 of the permanent magnet 520 inserted between the first and second rotor cores 540a and 540b, to fix the position of the permanent magnet 520, and thus act to prevent the permanent magnet 520 from moving during rotation of the rotor 300. When the rotor body 510 has a longer axial length than the permanent magnets 520, the first and second side protrusions may have portions disposed axially outwardly of the permanent magnets 520. Accordingly, the axial ends of the permanent magnets 520 may be supported by the first and second side protrusions 552a and 552b, so that the permanent magnets 520 may be prevented from moving axially.

The first and second side protrusions 552a and 552b may be arranged to correspond to each other in the circumferential direction of the rotor. Also, each of the first and second side protrusions 552a and 552b may include a plurality of side protrusions aligned in the radial direction of the rotor. Further, a plurality of side protrusions may be aligned in the axial direction of the rotor so that a plurality of side protrusions may be arranged in both the axial and radial directions of the rotor. Alternatively, the plurality of side protrusions may be disposed alternately in the radial and/or axial directions of the rotor so that side protrusions do not correspond to each other in the circumferential direction of the rotor.

Each rotor core 540 may include an aperture 542 formed adjacent to each side protrusion 552. The aperture 542 assists deformation of the side protrusion 552 occurring when the corresponding permanent magnet 520 is inserted into the corresponding rotor slot 550. The deformed side protrusion 552 elastically presses the permanent magnet 520, thereby preventing the permanent magnet 520 from be separated.

As shown in FIG. 10, the shapes of the side protrusion 552 and aperture 542 may be varied. In order to smoothly deform the guide protrusion 552 when the guide protrusion 552 is pressed by the permanent magnet 520, a curved (e.g., semicircular) surface 552c or an inclined (e.g., polygonal) surface 552d may be formed at the side protrusion 552. The aperture 542 may be formed with an arc portion (e.g., circular portion) 542a or an inclined portion (e.g., polygonal portion) 542b, which corresponds to the curved surface 552c or inclined surface 552d of the side protrusion 552.

Although FIG. 9 illustrates an example in which each rotor core is formed, at opposite side surfaces thereof, with side protrusions, respectively, such a side protrusion may be formed only at one side surface of the rotor core.

Figure 11:
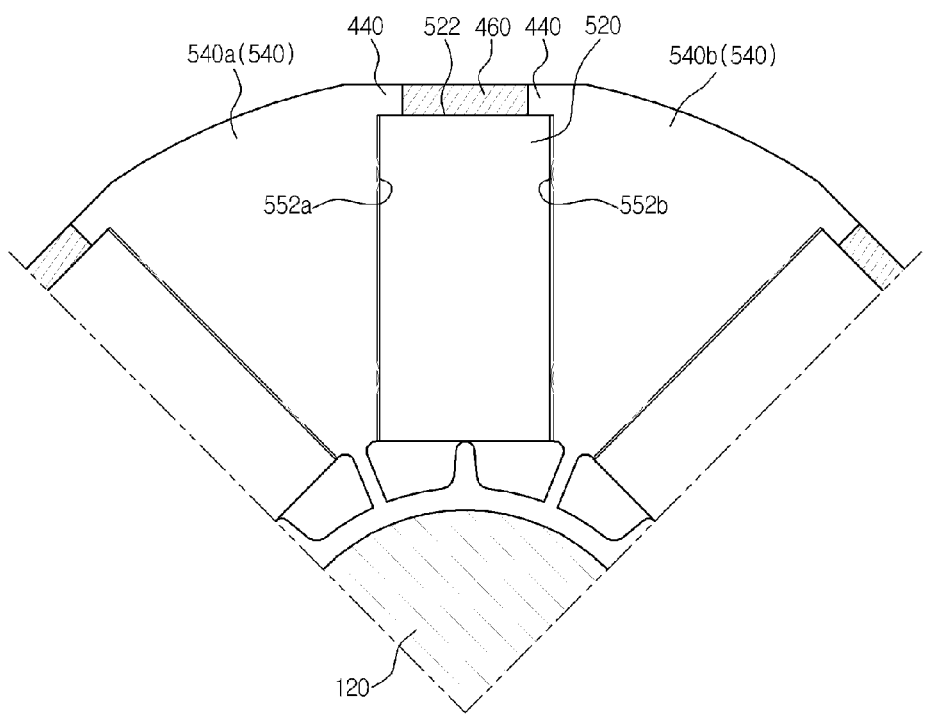
FIG. 11 is a sectioned perspective view illustrating a rotor according to another embodiment of the present invention.

FIG. 11 is a view illustrating a rotor according to an embodiment of the present invention. No description will be given of the configurations overlapping with those of FIG. 9. As shown in FIG. 11, a support member 460 may be disposed between the outer support protrusion 440 of the first rotor core 540a and the outer support protrusion 440 of the second rotor core 540b. The support member 460 supports the outer end 522 of the corresponding permanent magnet 520, along with the outer support protrusions 440. Thus, an enhancement in the structural stability of the rotor is achieved.

Similar to FIG. 4, plates may be arranged at opposite ends of the rotor body, respectively. The support member 460 may be coupled to each plate, so that it may be fixed.

Figure 12:
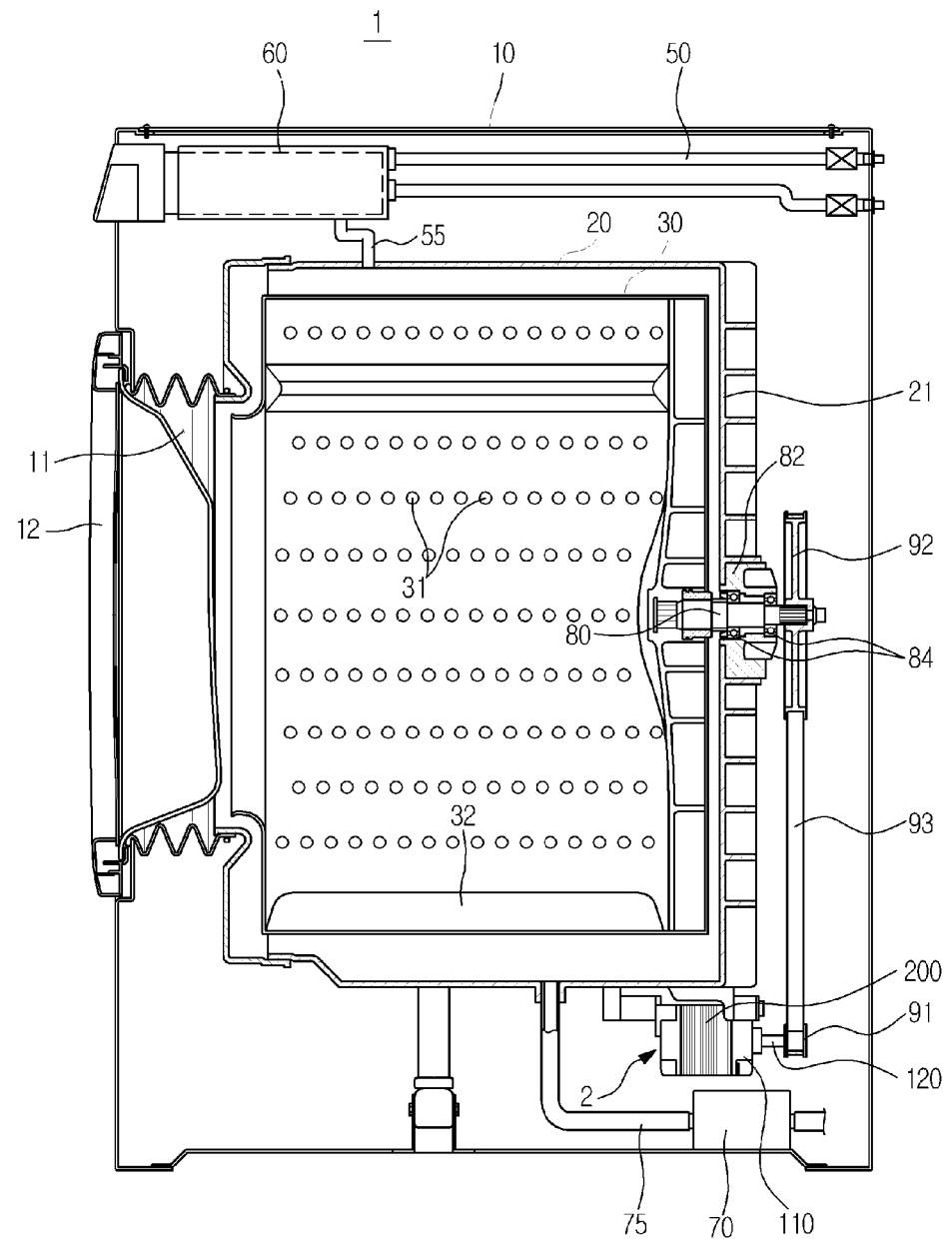
FIG. 12 is a view illustrating a washing machine, to which the motor according to the illustrated embodiment of the present invention may be applied.

FIG. 12 is a view illustrating a configuration of a washing machine according to an exemplary embodiment of the present invention.

As shown in FIG. 12, the washing machine, which is designated by reference numeral "1", includes a cabinet 10 to form an outer appearance of the washing machine, a tub 20 disposed within the cabinet 10, to store water, a drum 30 rotatably disposed within the tub 20, and a drive motor 2 to drive the drum 30.

A loading opening 11 is formed at a front wall of the cabinet 10, to allow loading of laundry. The loading opening 11 is opened or closed by a door 12 installed at the front wall of the cabinet 10.

A water supply tube 50 is installed over the tub 20, to supply washing water to the tub 20. The water supply tube 50 is connected, at one side thereof, to an external water supply source (not shown). The water supply tube 50 is also connected, at the other side thereof, to a detergent supplier 60. The detergent supplier 60 is connected to the tub 20 via a connecting tube 55. Water supplied through the water supply tube 50 is supplied to the interior of the tub 20, along with a detergent, via the detergent supplier 60.

A drainage pump 70 and a drainage tube 75 are installed beneath the tub 20, to drain water from the interior of the tub 20.

A plurality of through holes 31 are formed through a peripheral wall of the drum 30, for flow of washing water. Lifters 32 are installed on an inner surface of the peripheral wall of the drum 30, to allow tumbling of laundry during rotation of the drum 30.

A drive shaft 80 is coupled to the drum 30. The drive shaft 80 is rotatably supported by the tub 20. One end of the drive shaft 80 extends outwardly of the tub 20 after passing through a rear wall 21 of the tub 20.

A bearing housing 82 is installed at the rear wall 21 of the tub 20, to rotatably support the drive shaft 80. The bearing housing 82 may be made of an aluminum alloy. When the tub 20 is injection-molded, the bearing housing 82 may be inserted into the rear wall 21 of the tub 20. A bearing 84 is installed between the bearing housing 82 and the drive shaft 80, to allow the drive shaft 80 to rotate smoothly.

The drive motor 2 is mounted on a bottom wall of the tub 20. The drive motor 2 includes a motor housing 110, a stator 200 fixed to the motor housing 110, and a rotor (not shown) disposed within the stator 200. The drive motor 2 may include a stator and a rotor, which are selected from those described with reference to FIGS. 1 to 11.

A motor pulley 91 is mounted at an end of the motor shaft 120 extending outwardly of the motor housing 110. A drum pulley 92 is mounted to the drive shaft 80 connected to the drum 30. The motor pulley 91 and drum pulley 92 may be connected by a belt 93. The motor pulley 91, drum pulley 92, and belt 93 constitute a power transmission to transmit drive force from the motor 100 to the drive shaft 80 of the drum 30.

Although the washing machine has been described, as an example, with reference to FIG. 12, matters described in FIGS. 1 to 11 may be applied not only to various home electronic appliances such as a washing machine, a clothes drying machine, and an air conditioner, but also to an electric vehicle, which requires a miniaturized high-power motor.

As apparent from the above description, in accordance with embodiments of the present invention, it may be possible to achieve enhanced durability of a motor by increasing the structural strength of a rotor, and thereby preventing the rotor from being deformed or damaged during high-speed rotation thereof.

It may also be possible to achieve an enhancement in the performance of the motor through reduction of leakage of magnetic flux toward a motor shaft, and a reduction in motor size for the same output power.

The disclosure herein has provided example embodiments of a motor and a rotor thereof. However the disclosure is not limited to particular embodiments described herein. For example, although the motor and rotor thereof has been described as being applicable to the washing machine shown in FIG. 12, it may be applied to types of washing machines, for example, a top loading washing machine. Further, the motor need not be disposed in the location as shown in FIG. 12 and need not transmit a drive force from the motor via a belt, but may be disposed in other locations and may transmit a drive force through other mechanisms, so long as the desired performance may be achieved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A motor comprising:
a stator;
a rotor to co-operate with the stator in an electromagnetic manner such that the rotor rotates; and
a motor shaft coupled to the rotor, to rotate along with the rotor,
wherein the rotor comprises:
a sleeve having a shaft hole, through which the motor shaft extends;
a plurality of rotor cores spaced apart from one another in a circumferential direction of the rotor;
a plurality of permanent magnets each disposed between adjacent ones of the rotor cores; first and second cover plates disposed at opposite sides of the permanent magnets in an axial direction, each of the first and second cover plates comprising a shaft receiving hole to receive the motor shaft; and
a plurality of support members coupled to at least one of the first and second cover plates, each of the support members comprising a magnet support portion arranged to support an outer end of a corresponding one of the permanent magnets in a radial direction of the rotor, wherein each of the support members further comprises a connection support portion connected to a coupling protrusion after inwardly extending from the magnet support portion in the radial direction of the rotor, to support an axial end of the corresponding permanent magnet.

2. The motor according to claim 1, wherein:
the first cover plate further comprises coupling holes arranged in the circumferential direction of the rotor; and
each of the support members further comprises the coupling protrusion which protrudes from the magnet support portion in the axial direction to fit in a corresponding one of the coupling holes.

3. The motor according to claim 2, wherein the coupling protrusion has at least a portion extending outwardly of the first cover plate after passing through the corresponding coupling hole.

4. The motor according to claim 3, wherein the coupling protrusion has a head supported by an outer surface of the first cover plate around the corresponding coupling hole.

5. The motor according to claim 1, wherein the first cover plate further comprises plate grooves each formed at an inner surface of the first cover plate facing the permanent magnets, to receive the connection support portion of a corresponding one of the support members.

6. The motor according to claim 1, wherein each of the support members further comprises a first coupler provided at one end of the support member, to be coupled to the first cover plate; and
a second coupler provided at the other end of the support member, to be coupled to the second cover plate.

7. The motor according to claim 1, wherein:
the outer end of each of the permanent magnets is disposed more inwardly in a radial direction of the rotor than outer surfaces of the corresponding rotor cores disposed adjacent to each other in the circumferential direction of the rotor at opposite sides of the permanent magnet;
the rotor further comprises a support member receiving portion defined by the adjacent rotor cores and the outer end of the permanent magnet disposed between the adjacent rotor cores; and
the magnet support portion of the support member corresponding to the permanent magnet is disposed in the support member receiving portion.

8. The motor according to claim 1, wherein:
the rotor cores comprise first and second rotor cores arranged adjacent to each other in the circumferential direction of the rotor;
the adjacent first and second rotor cores comprise outer support protrusions extending to support a portion of the outer end of the permanent magnet disposed between the adjacent first and second rotor cores, respectively; and
the magnet support portion of the support member corresponding to the permanent magnet is disposed between the outer support protrusion of the first rotor core and the outer support protrusion of the second rotor core.

9. The motor according to claim 1, wherein the first and second cover plates are forcibly fitted around the motor shaft, to be fixed.

10. The motor according to claim 1, wherein each of the support members further comprises a non-magnetic body.

11. The motor according to claim 1, wherein:
each of the rotor cores comprises a side surface facing the corresponding permanent magnet in the circumferential direction of the rotor; and
the side surface of at least one of the rotor cores comprises at least one side protrusion extending toward a side surface of the corresponding permanent magnet.

12. The motor according to claim 11, wherein the at least one side protrusion comprises a plurality of side protrusions arranged in a radial direction of the rotor.

13. A motor comprising:
a stator;
a rotor to co-operate with the stator in an electromagnetic manner such that the rotor rotates; and
a motor shaft coupled to the rotor, to rotate along with the rotor,
wherein the rotor comprises:
a sleeve having a shaft hole, through which the motor shaft extends;
a plurality of rotor cores spaced apart from one another in a circumferential direction of the rotor;
a plurality of permanent magnets each disposed between adjacent ones of the rotor cores; first and second cover plates disposed at opposite sides of the permanent magnets in an axial direction, each of the first and second cover plates comprising a shaft receiving hole to receive the motor shaft; and
a plurality of support members coupled to at least one of the first and second cover plates, each of the support members comprising a magnet support portion arranged to support an outer end of a corresponding one of the permanent magnets in a radial direction of the rotor,
wherein:
each of the rotor cores comprises a side surface facing the corresponding permanent magnet in the circumferential direction of the rotor;
the side surface of at least one of the rotor cores comprises at least one side protrusion extending toward a side surface of the corresponding permanent magnet; and
the at least one of the rotor core further comprises an aperture formed adjacent to the at least one side protrusion, to assist deformation of the side protrusion.

14. A motor comprising:
a stator;
a rotor to co-operate with the stator in an electromagnetic manner such that the rotor rotates; and
a motor shaft coupled to the rotor, to rotate along with the rotor,
wherein the rotor comprises:
a sleeve having a shaft hole, through which the motor shaft extends;
a plurality of rotor cores spaced apart from one another in a circumferential direction of the rotor;
a plurality of permanent magnets each disposed between adjacent ones of the rotor cores; first and second cover plates disposed at opposite sides of the permanent magnets in an axial direction, each of the first and second cover plates comprising a shaft receiving hole to receive the motor shaft; and
a plurality of support members coupled to at least one of the first and second cover plates, each of the support members comprising a magnet support portion arranged to support an outer end of a corresponding one of the permanent magnets in a radial direction of the rotor, wherein:
each of the rotor cores comprises a side surface facing the corresponding permanent magnet in the circumferential direction of the rotor;
the side surface of at least one of the rotor cores comprises at least one side protrusion extending toward a side surface of the corresponding permanent magnet;
the rotor cores comprise first and second rotor cores arranged adjacent to each other in the circumferential direction of the rotor;
the first rotor core comprises a first side protrusion extending to press a first side surface of the permanent magnet disposed between the adjacent first and second rotor cores, and the second rotor core comprises a second side protrusion extending to press a second side surface of the permanent magnet disposed between the adjacent first and second rotor cores; and
the first and second side protrusions are arranged to correspond to each other in the circumferential direction of the rotor.

15. A motor comprising:
a stator;
a rotor to co-operate with the stator in an electromagnetic manner such that the rotor rotates; and a motor shaft coupled to the rotor, to rotate along with the rotor, wherein the rotor comprises:
- a sleeve having a shaft hole, through which the motor shaft extends;
- a plurality of rotor cores spaced apart from one another in a circumferential direction of the rotor;
- a plurality of permanent magnets each disposed between adjacent ones of the rotor cores; first and second cover plates disposed at opposite sides of the permanent magnets in an axial direction, each of the first and second cover plates comprising a shaft receiving hole to receive the motor shaft; and
- a plurality of support members coupled to at least one of the first and second cover plates, each of the support members comprising a magnet support portion arranged to support an outer end of a corresponding one of the permanent magnets in a radial direction of the rotor, wherein:
- each of the rotor cores comprises a side surface facing the corresponding permanent magnet in the circumferential direction of the rotor;
- the side surface of at least one of the rotor cores comprises at least one side protrusion extending toward a side surface of the corresponding permanent magnet; and
- the at least one side protrusion extends axially outwardly of the permanent magnet, to support an axial end of the permanent magnet.

16. A rotor of a motor, the rotor being disposed within a stator of the motor, the rotor comprising:
- a sleeve formed with a shaft hole to be coupled with a motor shaft;
- a plurality of rotor cores arranged to be spaced apart from one another in a circumferential direction of the rotor, to define a plurality of rotor slots;
- a plurality of bridges arranged to connect the rotor cores to the sleeve, respectively;
- a plurality of permanent magnets respectively inserted into the rotor slots, wherein an inner end of each of the permanent magnets is spaced apart from the sleeve;
- a plurality of inner support protrusions extending from the sleeve toward the rotor slots, to support the inner ends of the permanent magnets, respectively;
- a plurality of side protrusions extending from the rotor cores toward the rotor slots, to press side surfaces of the permanent magnets, respectively; and
- a plurality of support units each having at least a portion disposed outside a corresponding one of the permanent magnets in a radial direction of the rotor, to support at least a portion of an outer end of the corresponding permanent magnet, wherein:
- the rotor cores comprise first and second rotor cores arranged adjacent to each other in the circumferential direction of the rotor; and
- the plurality of side protrusions comprise a first side protrusion extending to press a first side surface of the permanent magnet disposed between the adjacent first and second rotor cores, and a second side protrusion extending to press a second side surface of the permanent magnet.

17. A rotor of a motor, the rotor being disposed within a stator of the motor, the rotor comprising:
- a sleeve formed with a shaft hole to be coupled with a motor shaft;
- a plurality of rotor cores arranged to be spaced apart from one another in a circumferential direction of the rotor, to define a plurality of rotor slots;
- a plurality of bridges arranged to connect the rotor cores to the sleeve, respectively;
- a plurality of permanent magnets respectively inserted into the rotor slots, wherein an inner end of each of the permanent magnets is spaced apart from the sleeve;
- a plurality of inner support protrusions extending from the sleeve toward the rotor slots, to support the inner ends of the permanent magnets, respectively;
- a plurality of side protrusions extending from the rotor cores toward the rotor slots, to press side surfaces of the permanent magnets, respectively; and
- a plurality of support units each having at least a portion disposed outside a corresponding one of the permanent magnets in a radial direction of the rotor, to support at least a portion of an outer end of the corresponding permanent magnet, wherein each of the rotor cores further comprise an aperture formed adjacent to the side protrusion of the rotor core, to assist deformation of the side protrusion.

\* \* \* \* \*